US009554581B2

(12) United States Patent
Willburger et al.

(10) Patent No.: US 9,554,581 B2
(45) Date of Patent: Jan. 31, 2017

(54) SAUSAGE COLLATING DEVICE AND METHOD FOR COLLATING SAUSAGES TO FORM SAUSAGE GROUPS

(71) Applicant: ALBERT HANDTMANN MASCHINENFABRIK GMBH & CO. KG, Biberach (DE)

(72) Inventors: Peter Willburger, Baindt (DE); Michael Fuergut, Biberach (DE); Michael Heim, Biberach (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 15/009,726

(22) Filed: Jan. 28, 2016

(65) Prior Publication Data

US 2016/0219891 A1     Aug. 4, 2016

(30) Foreign Application Priority Data

Feb. 3, 2015 (EP) .................................. 15153594

(51) Int. Cl.
*A22C 11/00* (2006.01)
*B65G 47/08* (2006.01)
(52) U.S. Cl.
CPC ........... *A22C 11/008* (2013.01); *B65G 47/082* (2013.01)
(58) Field of Classification Search
CPC .... A22C 11/0245; A22C 11/02; A22C 11/006
USPC ....... 452/30–32, 35–37, 46–48, 51; 198/418, 198/418.7, 418.8, 419.3, 429–433, 426
See application file for complete search history.

(56) References Cited

U.S. PATENT DOCUMENTS

| 5,161,665 A * | 11/1992 | Cragun ................ B65G 47/682 198/419.3 |
| 5,575,712 A * | 11/1996 | Krewer ................ A22C 11/008 452/177 |
| 6,837,360 B2 * | 1/2005 | Schoeneck ........... B65G 47/841 198/418.7 |
| 6,843,360 B2 * | 1/2005 | Peterman .............. B65B 35/405 198/418.6 |
| 7,665,598 B2 * | 2/2010 | Begin .................. B65G 47/082 198/419.1 |
| 7,757,462 B2 * | 7/2010 | Harrison ................ B65B 5/108 198/418.6 |
| 8,011,495 B2 * | 9/2011 | Anderson ............ B65G 47/088 198/419.2 |
| 2011/0124276 A1 | 5/2011 | Waldrop et al. |
| 2014/0106654 A1 | 4/2014 | Meggelaars et al. |

FOREIGN PATENT DOCUMENTS

| DE | 102007054956 A1 | 5/2009 |
| EP | 0749917 A2 | 12/1996 |
| EP | 2799349 A1 | 11/2014 |

* cited by examiner

*Primary Examiner* — Richard Price, Jr.
(74) *Attorney, Agent, or Firm* — Alleman Hall McCoy Russell & Tuttle LLP

(57) ABSTRACT

The invention relates to a sausage collating device and a method for collating sausages to form sausage groups of a predetermined number of sausages with a transport device for transporting spaced sausages and at least one accumulator element for accumulating the sausages, where the at least one accumulator element is for collating and is movable in the direction of transport of the transport device.

20 Claims, 4 Drawing Sheets

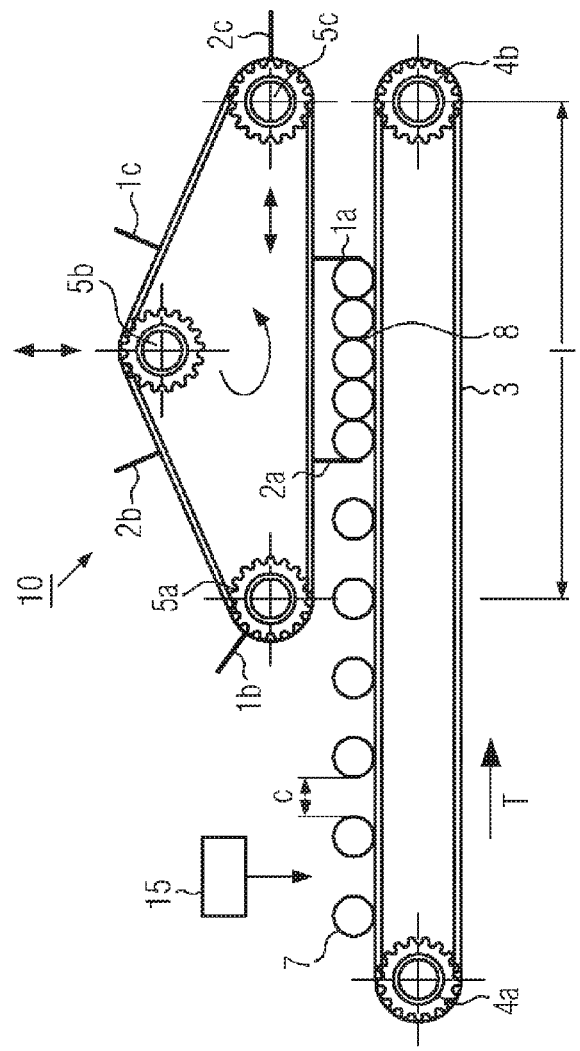
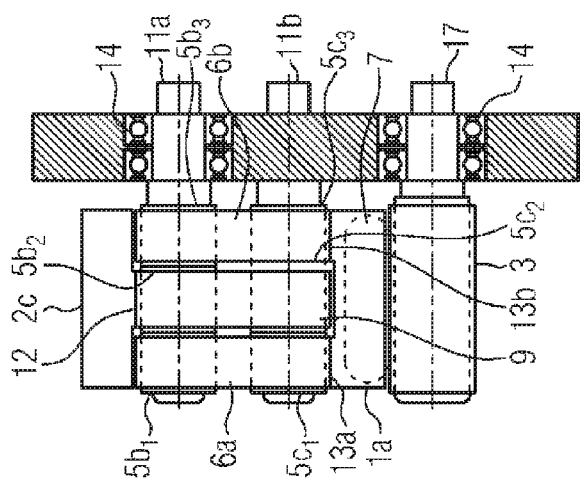
FIG. 1
FIG. 2

SAUSAGE COLLATING DEVICE AND METHOD FOR COLLATING SAUSAGES TO FORM SAUSAGE GROUPS

CROSS REFERENCE TO RELATED APPLICATIONS

The present application claims priority to European Patent Application No. 15 153 594.5, filed Feb. 3, 2015, the entire contents of which are hereby incorporated by reference for all purposes.

FIELD

The invention relates to a sausage collating device and to a method for collating sausages to form sausage groups

BACKGROUND AND SUMMARY

In the fully automated processing of single or connected sausage portions, e.g. when supplying packaging device, it is often necessary to collate the individual sausages or e.g. sausages connected in pairs, that are transported transversely to their longitudinal axis spaced apart on a transport belt to form groups of a predetermined number of portions and to further convey them as complete groups, for example, to a packaging machine. This has previously been achieved in that an accumulator pusher moveable transversely to the direction of transport is positioned stationarily upstream of the first portion or in the gap between two portions and stops and accumulates the subsequent portion until the desired number of portions of a group have been accumulated. The group is then again released and transported onward. The accumulator pusher is then repositioned in the gap between the last sausage of the group to be created and the subsequent first sausage of the subsequent next group.

However, it happens again and again in prior art that the round sausages—straight or curved—turn, rub against each other when being pushed and therefore roll on top of each other so that the sausage group no longer has one layer but uncontrolled multiple layers. It also happens when removing the pusher accumulator that the sausages of a sausage group do not remain correctly aligned.

Starting out from there, the present invention is based on the object to provide a sausage collating device and a respective method that allows collating sausages in a reliable and simple manner to form sausage groups.

The sausage collating device according to the invention for collating sausages to form sausage groups having a predetermined number of sausages comprises a transport device for transporting the sausages being spaced from each other. A respective transport device can be, for example, a transport belt. In addition, at least one accumulator element is provided for accumulating the sausages, this means that the sausages are pushed together at the accumulator element by the transport belt such that they are no longer spaced from one another. The at least one accumulator element is advantageously configured such that it is for collating and is movable in the direction of transport T of the transport device, i.e. can move together with the transport device in the direction of transport T. Due to the fact that the accumulating element is movable in the direction of the transport device, the velocity difference between the accumulating element and the transport device can be reduced or eliminated. Large friction between the surface of the conveyor and the sausage surface or the resting surface of the sausage, respectively, can thereby be prevented so that the sausages no longer turn, do not rub against each other and no longer roll over one another when accumulating, so that precise single-layer sausage groups can be produced.

The size of the sausage groups, i.e. the number of sausages per group can also be changed during operation.

Furthermore, the sausages do not after collating need to be accelerated from a standstill to the velocity of the transport device, so that it can be prevented that sausages roll apart. In addition, the advantage arises that the sausages are, after collating and when the sausage group is brought back to the transport device velocity, supported by at least one accumulator element and thereby held in position.

The sausage collating device advantageously comprises at least two individually drivable accumulator elements. Due to the fact that the accumulator elements are individually driven, consecutive accumulator elements, i.e. for example, a first accumulator element in the direction of transport located upstream of the first sausage of a sausage group and an accumulator element that is in the direction of transport located downstream of the last sausage of a sausage group, can be driven at different velocities such that an upstream accumulator element decelerates the sausages and a downstream accumulator element pushes the sausages in the direction of transport. For this purpose, a first drive device may be provided for at least one first accumulator element and a second drive device for at least one second accumulator element. The first and the second accumulator element can each be inserted alternately one after the other between the sausages at the respective sausage group boundaries.

The first and/or the second drive device comprises a revolving conveying member, such as a revolving belt, on which the respective at least one accumulator element is arranged, i.e. is mounted. This means that the sausage collating device according to an example embodiment comprises a belt system comprising at least two belts running parallel, to each of which at least one accumulator element is attached. Also several accumulator elements can in particular be mounted to each one revolving conveying member, in particular, belts. Such a structure is simple and inexpensive to implement.

The at least one accumulator element can according to one example embodiment in its motion during collation run in the direction of transport spaced from the surface of the transport device. The conveying member or belt is, for example, disposed such that it runs parallel to the transport device. If the accumulator element does not contact the surface of the transport device, then no friction loss arises between the accumulator element and the transport device and the accumulator element can move freely in its track.

The transport device is according to an example embodiment configured as an accumulation roller belt between the sausages or sausage groups, respectively, and the transport device can thereby be reduced even more. An accumulation roller belt is a revolving closed chain which is equipped with freely rotatable rollers on which the sausages rest. If the sausages are stopped or slowed down by the accumulator element, then the chain continues moving and the rollers rotate underneath the sausages.

It is advantageous to have the sausage collating device comprise a control device as well as a sensor device, where the sensor device can detect an arriving sausage and can send a corresponding signal to the control device. The positions of the arriving sausages are thereby known as a function of time, since also the transport velocity of the transport device is known.

The control device can therefore calculate the positions of the successively arriving sausages. However, it is also possible that the position is not calculated via the signal generated by the sensor, but that the control device knows these positions from the preceding process steps and calculates and initiates further treatment steps based thereupon. Consequently, a respective accumulator element can engage exactly between the last sausage of a first group and the first sausage of a subsequent group. This means that the drive device can be actuated in dependence of the collating assignment, i.e. in dependence of the sausage caliber, the distance of the sausages and the number of sausages in a sausage group.

The controller is according to the invention configured such that the accumulator elements are each drivable at varying velocity, meaning that—where the accumulator elements are configured as being revolving—the velocity during one revolution is not constant. The velocity of the respective accumulator element can thereby during collation be adapted precisely to the respective process step.

It is advantageous to have the revolving conveying members, in particular belts, run around more than two wheels, in particular, around three wheels, where optionally the length l of the section of the conveying members, in which the accumulator elements can move parallel to the transport device, can be adjusted in that the position of at least two wheels is variable.

If two of the wheels are adjustable, then the active length l can be adjusted without the need to employ a new revolving conveying member, i.e. another belt having a different length. This is particularly advantageous.

Sausages spaced from each other are in a method for collating sausages in groups with a predetermined number of sausages conveyed transverse to their longitudinal direction on a transport device and accumulated with at least one accumulator element. This means that the distance of the spaced sausages is there reduced to zero or the sausages are even somewhat squeezed together. At least one accumulator element is according to the invention for collating at least temporarily moved in the direction of transport.

At least two individually driven accumulator elements are there used to collate the sausages.

A first accumulator element is in the method according to the invention optionally inserted upstream of the first sausage of a sausage group and moves at least temporarily at a velocity of $V_1 < V_{transport\ device}$. A subsequent second accumulator element is according to an example embodiment inserted downstream of the last sausage of the sausage group to be created and moves at least temporarily at a velocity $V_2 > V_{transport\ device}$, where $V_{transport\ device}$ corresponds to the velocity of the transport device at which the sausages are transported.

This means that the sausages can be accumulated, i.e. be decelerated by a first accumulator element while the sausages can by a subsequent accumulator element be pushed in the direction of transport in such a manner that the distance between the sausages is reduced. If two accumulator elements are used for collating, between which the sausages are located, then the upstream accumulator element does not need to decelerate the sausages that much, so that the velocity difference between the decelerated sausage and the transport velocity of the transport device can be reduced. In addition, the sausages can be held reliably in position between the two accumulator elements.

If the distance between the first and the second accumulator element in the method according to the invention corresponds approximately to the product of sausage caliber and number of sausages per sausage group, then the velocity $V_1$, $V_2$ of the two accumulator elements can be adjusted to the velocity $V_{transport\ device}$ of the transport device, this means that the sausages are held by the two accumulator elements and are simultaneously returned to the same transport velocity. It can thereby be effectively prevented that the sausages roll when accelerated to belt velocity. The sausage group can during this synchronous travel be stabilized and calmed. The sausage group is held together in a compact manner.

Once the sausage group has been created, in particular after the synchronous travel, the first accumulator element, being located in the direction of transport upstream of the first sausage of the group, can be moved at a velocity $V_1 > V_{transport\ device}$ and thereby be conveyed away from the region through which the sausage groups move. The upstream accumulator element can therefore move away from the sausage group and release the sausage group.

The second subsequent accumulator element located downstream of the last sausage of the sausage group can then be decelerated to a velocity $V_2 < V_{transport\ device}$ to create a further subsequent sausage group by accumulation. It is even possible that the velocity of the accumulator element is there so greatly reduced such that it is at a standstill before the accumulator element contacts the first sausage of the subsequent sausage group, or is moved against the direction of transport T. However, once the accumulator element contacts the first sausage of the subsequent sausage group, it likewise moves in the direction of transport T in order to keep the velocity difference small between the sausage and the transport device. This means that the second downstream accumulator element for creating the first sausage group can be used as an upstream accumulator element for the subsequent group. This enables a continuous process.

BRIEF DESCRIPTION OF THE FIGURES

The invention shall be explained below in more detail with reference to the following figures.

FIG. 1 schematically shows a sectional view through one possible embodiment of a sausage collating device according to the present invention.

FIG. 2 very schematically shows a side view from the right onto FIG. 1 at a position in which a first and a second accumulator element are substantially oppositely disposed in the vertical direction.

DETAILED DESCRIPTION

Figure 3A:
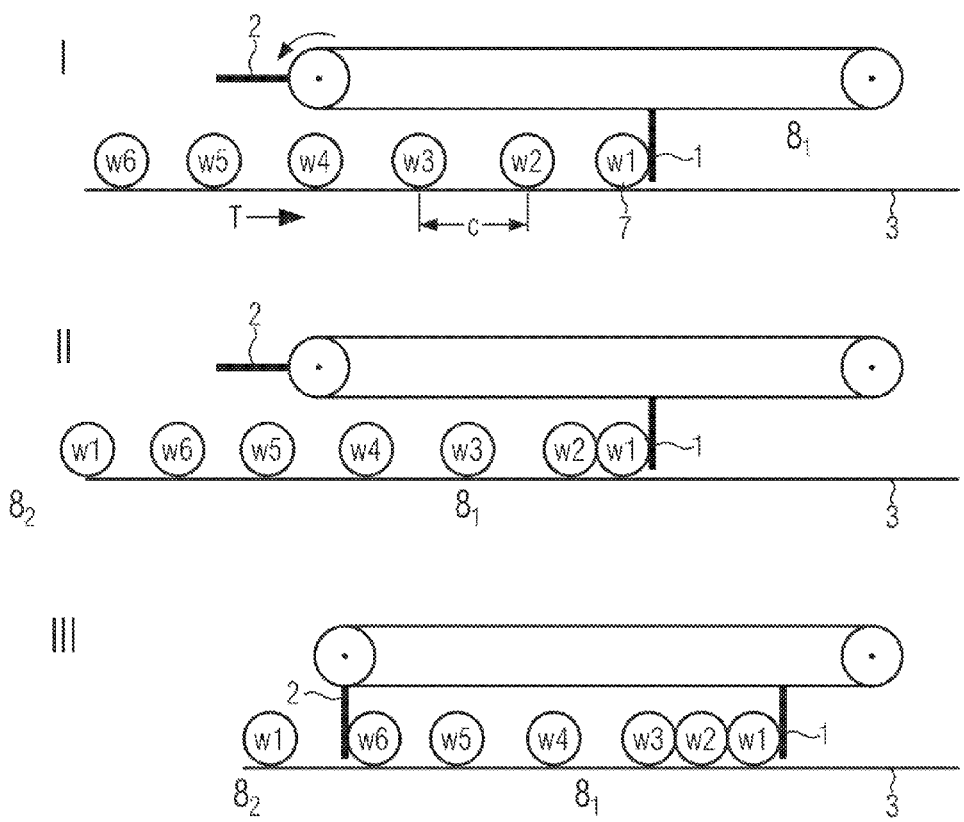
FIGS. 3A, 3B, and 3C show the different phases of an embodiment according to the present invention.

FIG. 1 shows one possible embodiment of a sausage collating device 10 according to the present invention.

The sausage collating device for collating sausages 7 to form sausage groups 8 having a predetermined number of sausages, in this case, for example, five sausages, comprises a transport device 3 on which the sausages are transported horizontally transverse to their longitudinal direction and transverse to the direction of transport T. Transport device 3 is in this embodiment a revolving conveyor belt circulating around two wheels 4a, 4b, where e.g. wheel 4b can be driven by a drive shaft 17 supported by bearings 14 (FIG. 2). Sausages 7 arrive, for example, from an upstream device and are spaced apart from each other. The sausages have in particular a spacing c from each other which is at least of the size that an accumulator element can be inserted between two adjacent sausages. Spacing c between two sausages typically corresponds to the sausage caliber, i.e. the diameter of the sausage ±5% to 100%. The spacing between the sausages can also be variable, in particular with short interruptions in production, where it is also possible that successive spacings differ from each other. In addition, sausage collating device 10 for creating sausage group 8 comprises at least one accumulator element 1a, 1b, 1c, 2a, 2b, 2c, in this embodiment e.g. six accumulator elements 1a, 1b, 1b, 2a, 2b, 2c.

As is evident in particular from the combination of FIGS. 1 and 2, this embodiment comprises two independent drive devices comprising revolving conveying members, presently in the form of revolving belts, to each of which several, presently three, accumulator elements are attached. As can be seen in particular from FIG. 2, a belt system is provided consisting of three belts disposed parallel to each other. Two outer belts 6a, 6b are driven synchronously, presently by drive shaft 11b and e.g., drive wheels 5c1, 5c3—where the drive comprises a drive motor, not shown. As is apparent from FIG. 2, an accumulator element 1a is via connection points 13a and 13b connected to straps or belts 6a and 6b. Accumulator element 1a is therefore moved by belts 6a, 6b on a closed path. Belts 6a, 6b additionally run over respective deflection wheels of wheel assembly 5a and 5b. A total of three accumulator elements 1a, 1b, 1c are in this embodiment attached to belts 6a, 6b and are uniformly distributed around the circumference. Accumulator elements 1a, 1b, 1c, as shown clearly in particular in FIG. 2, are not connected to revolving belt 9. Belt 9 likewise runs over respective center wheels or rollers of wheel assembly 5a, 5b, 5c. Center belt 9 is driven, for example, by drive shaft 11a and pulley 5b2, where drive shaft 11a may be supported by bearings 14. Deflection wheels or rollers 5b1, 5b3, on which belts 6a, 6b run, are presently not driven by shaft 11a. Belt 9 presently also comprises three accumulator elements 2a, 2b, 2c which are evenly distributed around the circumference of belt 9. These accumulator elements may be attached to belt 9 via connection points. As illustrated in FIG. 2, for example, accumulator element 2c is attached to belt 9 via connection point 12. The pulleys for belts 6a, 6b and belt 9 of wheel assemblies 5a, 5b, 5c are presently arranged coaxially. However, this is not mandatory. It is even possible that transport belts 6a, 6b and transport belt 9 do not have the same length. It is only essential that accumulator elements 1a, 1b, 1c can be driven independently from accumulator elements 2a, 2b, 2c and that accumulator elements being inserted consecutively between the sausage groups can be driven individually.

Accumulation belts 6a, 6b, and 9 are in this embodiment arranged parallel to transport device 3. The spacing is selected such that accumulator elements 1a, 1b, 1c, 2a, 2b, 2c do not contact transport device 3.

Albeit not shown, it would also be possible that every individual accumulator element 1a, 1b, 1c, 2a, 2b, 2c comprises its own drive, in particular its own belt.

Since always only one accumulator element of each revolving conveying member, presently the two belts 6a, 6b and belt 9, may be in engagement, it is advantageous if the belts run not only around two pulleys, but also in a triangle around three pulleys, where the active length l of the belt for collating can be influenced by adjusting at least two pulleys.

The active length l of the conveying member, in which the accumulator elements can move parallel to transport device 3, can therefore be adjusted. The belt section extending parallel to the surface of transport device 3 can therefore presently be adjusted to a certain length l depending on a certain collating assignment. At least two of the drive or deflection wheels of wheel assemblies 5a, 5b, 5c can for this purpose for the respective revolving conveying member, presently the conveyor belt, be adjusted in the vertical and/or the horizontal direction, in particular as illustrated in FIG. 1 by the double-sided arrows. If two of the wheels are adjustable, then the active length l can be adjusted without a new revolving conveying member, i.e. another belt having a different length, needing to be employed. This is particularly advantageous.

An adjustment mechanism is realized, for example, such that, as indicated in FIG. 1, the axle on which wheel 5c is attached is designed according to the double-sided arrow as being horizontally adjustable, and the axle on which wheel 5b is mounted is for restoring the belt tension re-adjusted vertically and/or horizontally.

Figure 4:
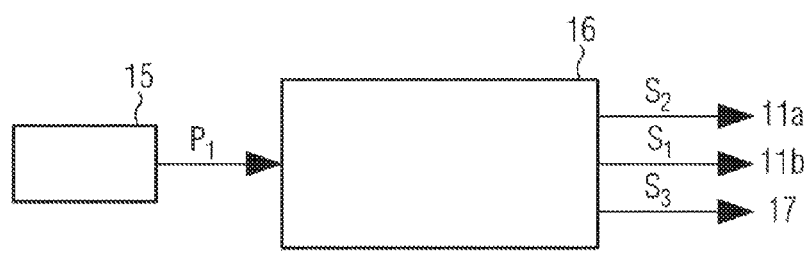
FIG. 4 very schematically shows the controller according to the present invention.

The device further comprises a sensor 15, for example, an optical sensor which detects an arriving sausage and passes a corresponding signal P1, as shown in FIG. 4, to a control device 16. The controller subsequently calculates therefrom the positions of individual sausages 7. This means that control device 16, since also the velocity of transport device 3 is known, can calculate exactly when an accumulator element 1a, 1b, 1c, 2a, 2b, 2c is to be inserted between two consecutive individual sausages 7. Control device 16 sends the corresponding signals S1, S2 to the drives, i.e. drive motors, which then drive, for example, shafts 11a, 11b. The control device then controls the drive devices for the accumulator elements in dependence of the sausage caliber, the spacing of sausages 7 and the number of sausages in a group.

It is also possible that controller 16 determines the positions of the sausages not by use of sensor signal P1, but that controller 16 knows these positions from earlier preceding process steps and calculates and initiates the further treatment steps based thereupon.

The accumulator elements can be configured as accumulation plates, as shown for example in FIG. 2. However, they can also be configured as cams or a plurality of juxtaposed pins. Furthermore, the accumulator elements can also be adapted to the contour of a curved sausage. The accumulation belts can, as shown, be disposed above the surface of transport device 3. However, they can also be arranged lateral to or below the transport belt surface and from there engage in between the sausages. If the accumulation belts engage from beneath, then transport belt 3 must necessarily be composed of a plurality of spaced individual belts arranged in parallel between which the multipart accumulator elements can reach through.

In order to even further reduce friction between sausages 7 and transport device 3, the transport device can be designed as accumulation roller belt. An accumulation roller belt is a circulating closed chain which is equipped with freely rotatable rollers on which the sausages rest. When the sausages accumulate, then the chain moves on and the rollers rotate beneath the sausages.

Figure 3B:
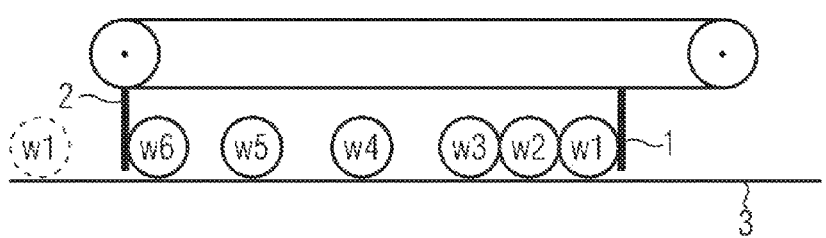
Figure 3B:
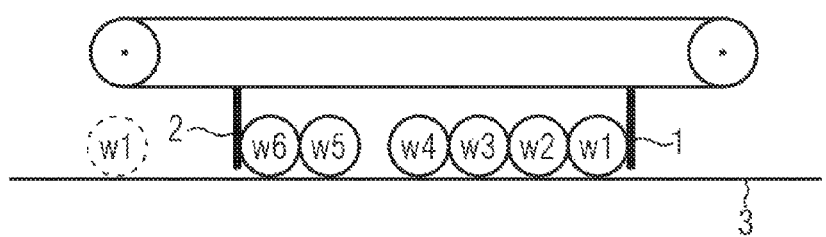
Figure 3B:
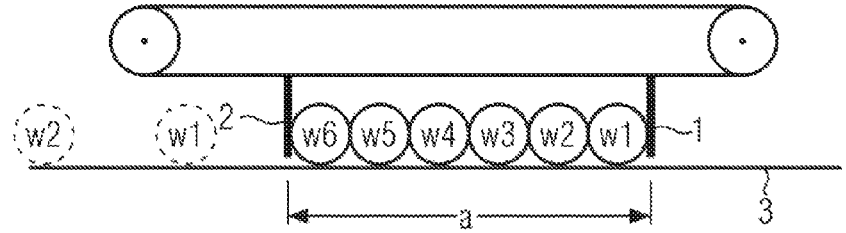
Figure 3C:
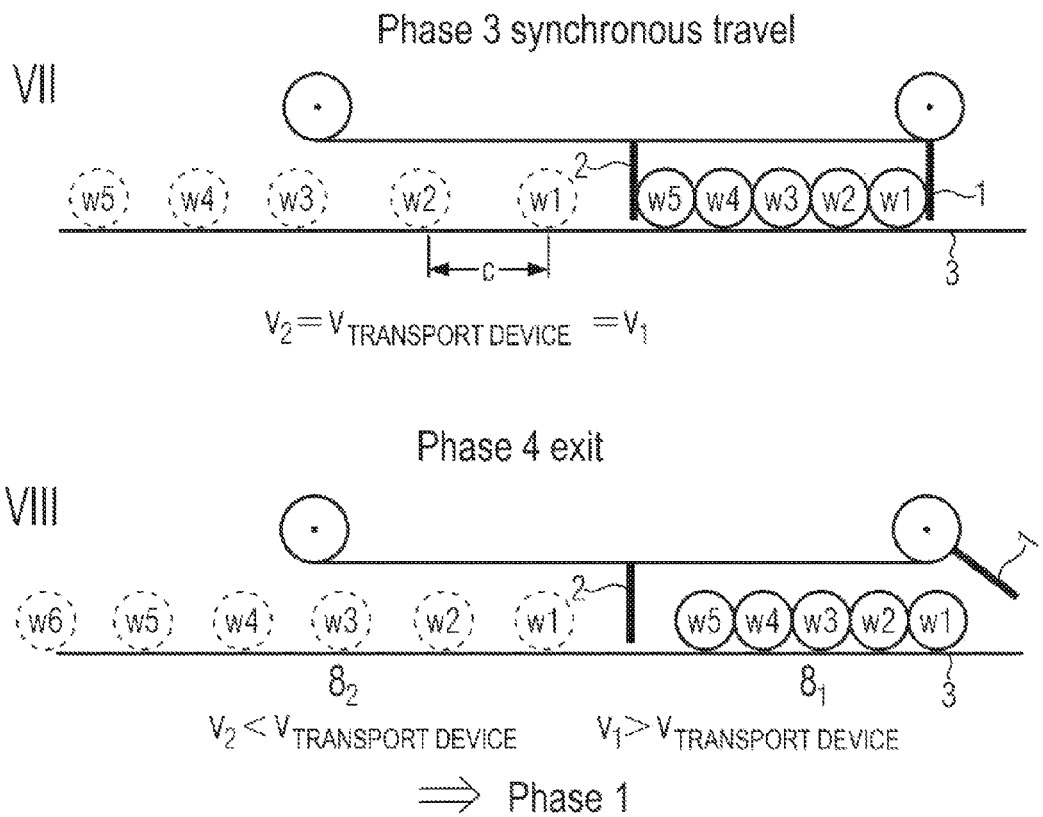

The method according to the invention is described below in more detail with reference to FIGS. 3a, 3b, and 3c.

In this embodiment, for example, six sausages 7 (w1-w6) are to be collated to form a sausage group. The individual sausages arriving on transport device 3 have, for example, a caliber of 10 mm to 45 mm and a spacing c of 10 mm to 100 mm. The velocity of the transport device $V_{transport\ device}$ is, for example, in a range from 30 mm/s to 1000 mm/s.

The method is for the sake of simplicity explained using two drive devices each with one accumulator element 1 and 2 which can be individually driven. Accumulation first occurs in first phase 1 (FIG. 3A). Arriving sausages 7 during their transport on transport device 3 move toward first accumulator element 1 which moves at a lower velocity $V_1 < V_{transport\ device}$ as shown in I. In this embodiment, $V_1 = 0.5 \times V_{transport\ device}$. In general, velocity $V_1$ can be between 0 and 99%, for example in a range from 20% to 80%, of the velocity $V_{transport\ device}$. Due to the velocity difference $V = \Delta V = V_{Transport} - V_1$, first sausage w1 of sausage Group 8$_1$ moves toward accumulator element 1 and the gaps between the sausages are successively reduced during transport, as is evident in particular from II. Should a larger gap arise during the supply of the sausages, then the velocity of accumulator element 1 can also be reduced to a standstill until a sausage is again available to complete the sausage group. After a predetermined number of single sausages 7, presently six sausages that are collated to form a sausage group, the second accumulator element 2 being driven by a different drive and presently, for example, revolving on a different belt, is inserted into the gap between last sausage w6 of the first group and subsequent sausage w1, is presently swung in.

The size of the sausage groups, i.e. the number of sausages per group can also be changed during operation so that, for example, sausage groups alternatingly consisting of 5 and 7 sausages are produced.

If—as shown in III—accumulator element 2 is positioned in the gap between w6 and w1, phase 2 (FIG. 3b), pushing takes place. Accumulator element 2 is there moved at a velocity $V_2$ that is greater than $V_{transport\ device}$, where $V_2$ may be in a range between 100% and 200% of the velocity $V_{transport\ device}$, as shown in IV. First accumulator element 1 is in this embodiment still moving at a lower velocity than the transport device whereas second accumulator element 2 moves at a greater velocity than transport device 3. Rear sausages w6, w5, as is apparent when comparing IV and V, are thereby pushed in the direction of transport toward sausages w1 to w4 accumulated by first accumulator element 1.

Accumulator elements 1 and 2 perform a respective motion until the spacing between the two accumulator elements 1, 2 corresponds to the product of the sausage caliber and the number of sausages per group, i.e. presently assumes dimension a—see VI.

After completing the pushing operation, phase 3 occurs (FIG. 3c), namely synchronous travel, as is apparent from VII. The sausages collated to form a compact sausage group are then to be brought back to $V_{transport\ device}$. Velocity $V_1$, $V_2$ of the two accumulator elements 1, 2, and thus the velocity of the entire sausage group, is therefore adapted to transport velocity $V_{transport\ device}$ of transport device 3, so that the sausage group produced is moved onward at $V_{transport\ device}$. Accumulator elements 1, 2 are moved onward a predetermined distance at $V_{transport\ device}$ so that the sausage group is calmed and the acceleration initiated no longer exerts any effect on the behavior of the sausage group. The sausages can then maintain an exact position.

This is followed by phase 4 (FIG. 3c), namely exit of the sausage group. Leading accumulator element 1 is for this purpose moved at an increased velocity such that $V_1 > V_{transport\ device}$, optionally such that $V_1 = 105\%$ to 200% of $V_{transport\ device}$. The velocity of subsequent accumulator element 2 is at the same time reduced to $V_2 < V_{transport\ device}$ or stopped entirely, where accumulator element 2 then assumes the accumulation function according to accumulator element 1 for creating the first sausage group 8$_1$ (see II). It is also possible that this accumulator element approaches the first sausage w1 of the next group 8$_2$ for a certain distance, i.e. in the opposite direction of the direction of transport T. However, if first sausage w1 of second sausage group 8$_2$ contacts accumulator element 2, then the latter already moves at a velocity in the direction of transport which, however, in turn is less than velocity $V_{transport\ device}$. The process now begins anew and after a certain number of sausages, presently six sausages, a subsequent accumulator element being driven independently of the preceding accumulator element is again inserted in the gap between last sausage w6 of group 8$_2$ and first sausage w1 of the next group, as previously described. For example, accumulator element 1 can for this purpose with increased velocity be brought into the respective position or, for example, a preceding accumulator element 1 arranged on the same belt engages in the gap between sausage portions 1, where in the case when e.g. several accumulator elements 1a, 1b, 1c are arranged on one belt or a pair of belts 9, 6a, 6b (see FIG. 1).

After control device 16 has stored the sausage caliber, the desired number of sausages per sausage group, distance c between the individual sausages and also the position of the individual sausages as a function of time (for example via sensor 15 or via signals from preceding devices) as well as the structural dimensions, such as, for example, length l of the path on which the accumulator elements can be moved parallel to the transport device 3, i.e. the belt section running parallel to the transport device 3, the controller can respectively precisely calculate the movement sequence of accumulator elements 1a, 1b, 1c, 2a, 2b, 2c and the drives.

The advantage of this solution is inter alia to be seen in the fact that friction between sausages 7 and transport device 3 is less than with static accumulation pushers. In addition, the portions would after forming a sausage group not need to be accelerated from standstill (as in static accumulation) to $V_{transport\ device}$, which often leads to the group rolling apart, especially with straight sausages. According to the invention, complete sausage group 8 may be accelerated by external forces to the velocity of the transport device, e.g., from a reduced velocity at which the sausages move in the direction of transport, (e.g. from half the velocity of the transport device), and then calmed, where the sausage group is held together in a compact manner by accumulator elements 1, 2 bearing against both ends.

A second variant substantially corresponds to the embodiment shown in FIG. 3, where the first sausages of a sausage group 8 are there accumulated by first accumulator element 1 running at a velocity $V_1 < V_{transport\ device}$, e.g. at half the velocity. First accumulator element 1 then moves onward at velocity $V_1 = V_{transport\ device}$ so that also the first sausages of the sausage group can again move at a correspondingly high velocity in the direction of transport T. The second part of the sausage group is then by second subsequent accumulator element 2 moved, pushed together from behind, at velocity $V_2 > V_{transport\ device}$. If the sausage group pushed together has size a, as shown in VI of FIG. 3, then the previously described synchronous travel for calming the sausage group occurs whereafter sausage group 8 can then exit.

A third variant essentially corresponds to the previous variants, where the number of sausages collated to form a group moves at a velocity equal to $V_{transport\ device}$ between retracted accumulator elements 1, 2. Only then does accumulation of the leading sausages simultaneously begin in that leading accumulator element S1, in front of a leading sausage of the group, runs at velocity $V_1 = V_{transport\ device}$, and subsequent second accumulator element 2 simultaneously moves at velocity $V_2 > V_{transport\ device}$, behind a last sausage of the group, until the sausage group is according to VI in FIG. 3b fully created.

According to a fourth variant, the sausages of a sausage group 8 are accumulated only by one accumulator element 1 moving at velocity $V_1$, where $V_1$=30% to 90% of $V_{transport\ device}$ without being pushed together from behind.

According to a fifth variant, the sausages of a sausage group 8 pushed together only by one accumulator element from behind, i.e. by one accumulator element moving at velocity $V_2$, where $V_2$=110% to 200% of $V_{transport\ device}$ without being accumulated by an accumulation pusher which is located at the front end of the sausage group.

The invention claimed is:

1. A sausage collation device for collating sausages to form sausage groups having a predetermined number of sausages, comprising
    a transport device for transporting said sausages spaced apart from each other;
    at least two accumulator elements for collating said sausages, where said at least two accumulator elements for collating are movable in a direction of transport T of said transport device; and
    a control device including instructions for:
        inserting a first accumulator element upstream a first sausage of a first sausage group,
        inserting a second accumulator element downstream a last sausage of said first sausage group, and
        pushing said first sausage group together between said first accumulator element and said second accumulator element.

2. The sausage collation device according to claim 1, wherein the at least two accumulator elements comprise at least two independently drivable accumulator elements.

3. The sausage collation device of claim 2, further comprising a first drive device with at least one accumulator element, and a second drive device with at least one accumulator element.

4. The sausage collation device according to claim 3, wherein said first and/or second drive device comprise a revolving conveying member on which said respective at least one accumulator element is arranged, where said revolving conveying member includes a revolving belt.

5. The sausage collation device according to claim 4, wherein said revolving conveying members run around more than two wheels, and where a length l of a section of said conveying members, in which said accumulator elements move parallel to said transport device, is adjusted by varying a position of at least two wheels of the more than two wheels.

6. The sausage collation device according to claim 1, wherein said at least two accumulator elements in their motion during collation run in the direction of transport T spaced from and preferably parallel to a surface of said transport device.

7. The sausage collation device according to claim 1, wherein said transport device is an accumulation roller belt.

8. The sausage collation device according to claim 1, further comprising a sensor device which detects an arriving sausage and transmits a corresponding signal to said control device.

9. The sausage collation device according to claim 8, wherein said control device calculates positions of successive sausages transported away and actuates a drive or drives of said at least two accumulator elements such that said second accumulator element engages between the last sausage of said first group and a first sausage of a subsequent group.

10. The sausage collation device according to claim 1, wherein said at least two accumulator elements are driven at varying velocity.

11. A method for collating sausages with a sausage collating device to form sausage groups having a predetermined number of sausages comprising:
    conveying spaced sausages transverse to their longitudinal direction on a transport device and accumulating said sausages by at least two accumulator elements,
    wherein said at least two accumulator elements are for collating and are moved at least temporarily in a direction of transport T of said transport device,
    wherein a first sausage group is collated by moving a first accumulator element upstream of a first sausage of said first sausage group and by moving a subsequent second accumulator element downstream a last sausage of said first sausage group, and
    wherein said subsequent second accumulator element pushes said first sausage group together between said first accumulator element and said subsequent second accumulator element.

12. The method according to claim 11, wherein said at least two accumulator elements are independently driven accumulator elements.

13. The method according to claim 12, wherein said first accumulator element is at least temporarily moved at a velocity $V_1 < V_{transport\ device}$, and
    said subsequent second accumulator element is moved at least temporarily at a velocity $V_2 > V_{transport\ device}$, where said velocity $V_{transport\ device}$ is the velocity of said transport device.

14. The method according to claim 13, wherein after creating said first sausage group, said first accumulator element, in the direction of transport T and disposed upstream of said first sausage group, is driven at a velocity $V_1 > V_{transport\ device}$ and is moved away from a region which sausage groups pass, and said subsequent second accumulator element, in the direction of transport T and disposed downstream of said last sausage of the first sausage group, is decelerated to velocity $V_2 < V_{transport\ device}$ to create a subsequent sausage group, where a further subsequent accumulator element is inserted downstream of a last sausage of said subsequent sausage group.

15. The method according to claim 11, wherein when a distance between said first accumulator element and said subsequent second accumulator element substantially corresponds to a product of a sausage caliber and a number of sausages per sausage group, then velocities of said two accumulator elements are set to a velocity of said transport device.

16. The method according to claim 11, wherein two successive accumulator elements are attached to respective individually driven revolving conveying members, including conveyor belts, and each revolve on a closed path.

17. A method for collating sausages to form sausage groups having a predetermined number of sausages comprising:
    conveying spaced sausages transverse to their longitudinal axes on a transport device having a velocity $V_{transport\ device}$; and
    accumulating said sausages with at least two accumulator elements by pushing said sausages together between a first accumulator element and a second accumulator element of said at least two accumulator elements, wherein said at least two accumulator elements are driven at varying velocities and moved in a direction of transport T of said transport device.

18. The method of claim 17, wherein said first accumulator element moves in front of a sausage group at a velocity $V_1$, where $V_1$=30% to 90% of $V_{transport\ device}$.

19. The method of claim 17, wherein said sausages are pushed together by said second accumulator element, said second accumulator element positioned behind a sausage group and moving at a velocity $V_2$, where $V_2$=110% to 200% of $V_{transport\ device}$.

20. The method of claim 17, where accumulating said sausages includes:
- retracting said first accumulator element and said second accumulator element so that a sausage group of said predetermined number of sausages is between the first and second accumulator elements, the first accumulator element in front of a leading sausage of said sausage group and the second accumulator element behind a last sausage of said sausage group;
- moving said sausage group at a velocity equal to said $V_{transport\ device}$;
- moving the first accumulator element at a velocity $V_1$, where $V_1 = V_{transport\ device}$; and
- moving the second accumulator element at a velocity $V_2$, where $V_2 > V_{transport\ device}$.

* * * * *